US008946633B2

(12) United States Patent
Tomioka

(10) Patent No.: US 8,946,633 B2
(45) Date of Patent: Feb. 3, 2015

(54) TERAHERTZ WAVE DETECTION DEVICE, TERAHERTZ WAVELENGTH FILTER, IMAGING DEVICE, AND MEASUREMENT DEVICE

(75) Inventor: Hiroto Tomioka, Chino (JP)

(73) Assignee: Seiko Epson Corporation (JP)

( * ) Notice: Subject to any disclaimer, the term of this patent is extended or adjusted under 35 U.S.C. 154(b) by 320 days.

(21) Appl. No.: 13/405,804

(22) Filed: Feb. 27, 2012

(65) Prior Publication Data

US 2012/0241615 A1    Sep. 27, 2012

(30) Foreign Application Priority Data

Mar. 23, 2011    (JP) .................. 2011-064406

(51) Int. Cl.
| | |
|---|---|
| G01J 5/02 | (2006.01) |
| G01J 5/08 | (2006.01) |
| G01J 3/02 | (2006.01) |
| G01J 3/42 | (2006.01) |
| G01J 5/04 | (2006.01) |
| H01P 1/20 | (2006.01) |

(52) U.S. Cl.
CPC ............. *G01J 5/085* (2013.01); *G01J 3/0243* (2013.01); *G01J 3/42* (2013.01); *G01J 5/046* (2013.01); *G01J 5/0831* (2013.01); *G01J 5/0862* (2013.01); *H01P 1/2005* (2013.01)
USPC ..................... 250/332; 250/339.01

(58) Field of Classification Search
CPC ........................................... G01J 5/02
USPC ............................ 250/332, 339.01
See application file for complete search history.

(56) References Cited

U.S. PATENT DOCUMENTS

| 2007/0165295 A1 | 7/2007 | Kim et al. |
| 2009/0116029 A1 | 5/2009 | Ohtera et al. |

(Continued)

FOREIGN PATENT DOCUMENTS

| JP | 2005-265793 A | 9/2005 |
| JP | 2007-139445 | 6/2007 |
| JP | 2007-193298 A | 8/2007 |

(Continued)

OTHER PUBLICATIONS

Extended European Search Report for Application No. EP 12 16 0578 mailed Oct. 2, 2012 (6 pages).

(Continued)

*Primary Examiner* — David Porta
*Assistant Examiner* — Faye Boosalis
(74) *Attorney, Agent, or Firm* — Harness, Dickey & Pierce, P.L.C.

(57) ABSTRACT

A terahertz wave detection device includes a wavelength filter transmitting terahertz waves having a predetermined wavelength, and a detection portion detecting the terahertz waves having the predetermined wavelength that have passed through the wavelength filter by converting the terahertz waves into heat, wherein the wavelength filter includes a metal layer having a plurality of holes communicating with an incident surface onto which the terahertz waves are incident and an emission surface from which the terahertz waves having the predetermined wavelength are emitted, and a dielectric portion filling in the plurality of holes and made of a dielectric, wherein the plurality of holes are formed with a predetermined pitch along a direction that is perpendicular to a normal line of the incident surface.

18 Claims, 7 Drawing Sheets

(56) References Cited

U.S. PATENT DOCUMENTS

2009/0303624 A1  12/2009  Fujii et al.
2011/0114856 A1* 5/2011  Cooke ..................... 250/492.22

FOREIGN PATENT DOCUMENTS

| JP | 2008-151619 A | 7/2008 |
| WO | 2007-029714 | 3/2007 |
| WO | 2008-075624 | 6/2008 |

OTHER PUBLICATIONS

Jiaguang Han et al., "Terahertz Transmission in Subwavelength Holes of Asymmetric Metal-Dielectric Interfaces: The Effect of a Dielectric Layer", Journal of Applied Physics, American Institute of Physics, New York, vol. 103, No. 3, Feb. 14, 2008, pp. 33108-1-33108-4.

Masaki Tanaka et al., "Effect of a Thin Dielectric Layer on Terahertz Transmission Characteristics for Metal Hole Arrays", Optics Letters, OSA, Optical Society of America, Washington, DC, vol. 30, No. 10, May 15, 2005, pp. 1210-1212.

C. Winnewisser et al., "Transmission Characteristics of Dichroic Filters Measured by THZ Time-Domain Spectroscopy", Applied Physics A, vol. 66, No. 6, Jun. 1, 1998, pp. 593-598.

T. Tanaka et al., "THz-Wave Filters Using Surface Periodic Structures Composed of the Metal Films", Research Center for Integrated Quantum Electronics, Sep. 7, 2004, pp. 53-55 with English Translation.

* cited by examiner

TERAHERTZ WAVE DETECTION DEVICE, TERAHERTZ WAVELENGTH FILTER, IMAGING DEVICE, AND MEASUREMENT DEVICE

The entire disclosure of Japanese Patent Application No. 2011-064406 filed Mar. 23, 2011 is incorporated by reference.

BACKGROUND

1. Technical Field

The present invention relates to a terahertz wave detection device, a terahertz wavelength filter, an imaging device, and a measurement device.

2. Related Art

Recently, terahertz waves have gained attention. Terahertz waves are electromagnetic waves having frequencies equal to or greater than 100 GHz and equal to or less than 30 THz. Terahertz waves may be used, for example, for imaging, various measurements such as spectroscopy, nondestructive inspection, and the like.

A terahertz wave detector that detects terahertz waves may be a pyroelectric sensor or a bolometer. A major feature of both these detectors may be high sensitivity to terahertz waves. Further, a large and cumbersome optical delay mechanism such as a THz-TDS (Time-Domain Spectrometry) spectrophotometer is unnecessary.

However, since a pyroelectric sensor or a bolometer only detects the presence or absence of terahertz waves via a change in the quantity of heat from the device, it is not possible to detect the frequency spectrum of the terahertz waves. Further, to perform spectrum detection, a wavelength filter that selectively transmits terahertz waves having a predetermined wavelength that is desired to be detected becomes necessary.

A wavelength filter that transmits terahertz waves having a predetermined wavelength has been proposed (for example, see International Publication WO. 08/75624). This wavelength filter includes a substrate, and a metal film installed on the substrate. The metal film has a plurality of holes. By combining this wavelength filter and the pyroelectric sensor or the bolometer, only terahertz waves having a predetermined wavelength are detected.

However, if such a wavelength filter is designed for the terahertz wavelength band, the pitch of the holes is increased, and thus the area of the wavelength filter becomes too large.

SUMMARY

An advantage of some aspects of the invention is to provide a terahertz wave detection device, a terahertz wavelength filter, an imaging device, and a measurement device, which can achieve miniaturization.

An aspect of the invention is directed to a terahertz wave detection device, which includes a wavelength filter transmitting terahertz waves having a predetermined wavelength; and a detection portion detecting terahertz waves having the predetermined wavelength that have passed through the wavelength filter by converting the terahertz wave into heat, wherein the wavelength filter includes a metal layer having a plurality of holes communicating with an incident surface onto which the terahertz wave is incident and an emission surface from which terahertz waves having the predetermined wavelength are emitted; and a dielectric portion filling in the plurality of holes and made of a dielectric, wherein the plurality of holes are formed with a predetermined pitch along a direction that is perpendicular to a normal line of the incident surface.

Accordingly, it is possible to provide a terahertz wave detection device which can achieve greater miniaturization than in the related art.

That is, in the wavelength filter, terahertz waves that are incident to the dielectric portion are compressed by the dielectric portion, and their wavelength is shortened. Accordingly, since the wavelength filter can be designed for a wavelength that is shorter than the predetermined wavelength of the terahertz waves that penetrate the wavelength filter, the area of the wavelength filter can be reduced, and thus the terahertz wave detection device can be miniaturized.

In the terahertz wave detection device according to the aspect of the invention, it is preferable that the wavelength filter have a dielectric layer installed on a surface of the incident surface of the metal layer and a surface on the incident surface side of the dielectric portion and made of dielectric.

Accordingly, terahertz waves having the predetermined wavelength can be reliably detected with high accuracy.

In the terahertz wave detection device according to the aspect of the invention, it is preferable that the relative dielectric constant of the dielectric layer be equal to or greater than 50.

Accordingly, the terahertz wave detection device can be miniaturized.

In the terahertz wave detection device according to the aspect of the invention, it is preferable that the dielectric that forms the dielectric layer include at least one of metal oxide, metal carbide, and metal nitride.

Accordingly, the terahertz wave detection device can be miniaturized.

In the terahertz wave detection device according to the aspect of the invention, it is preferable that the metal included in the dielectric that forms the dielectric layer belonging to any one of group 3, group 4, and group 5 of the periodic table of elements.

Accordingly, the terahertz wave detection device can be miniaturized.

In the terahertz wave detection device according to the aspect of the invention, it is preferable that the relative dielectric constant of the dielectric portion be equal to or greater than 50.

Accordingly, the terahertz wave detection device can be miniaturized.

In the terahertz wave detection device according to the aspect of the invention, it is preferable that the dielectric that forms the dielectric portion include at least one of metal oxide, metal carbide, and metal nitride.

Accordingly, the terahertz wave detection device can be miniaturized.

In the terahertz wave detection device according to the aspect of the invention, it is preferable that the metal included in the dielectric that forms the dielectric portion belong to any one of group 3, group 4, and group 5 of the periodic table of elements.

Accordingly, the terahertz wave detection device can be miniaturized.

In the terahertz wave detection device according to the aspect of the invention, it is preferable that the wavelength filter have a substrate installed on the emission surface of the metal layer.

Accordingly, the structural strength of the wavelength filter is improved, and the reliability of the terahertz wave detection device can be improved.

In the terahertz wave detection device according to the aspect of the invention, it is preferable that the incident surface of the filled holes be in the form of a circle as seen from a plane in the direction of a normal line of the incident surface of the filled holes, and the holes be formed to satisfy the following equation (1) on the assumption that a diameter of the circle is d and a distance between centers of the circles of two neighboring holes as seen from the plane in the direction of the normal line of the incident surface is s.

$$0.25 \leq d/s < 1 \qquad (1)$$

Accordingly, terahertz waves having the predetermined wavelength can be detected with high accuracy.

In the terahertz wave detection device according to the aspect of the invention, it is preferable that a thickness in a direction of a normal line of the incident surface of the metal layer be equal to or less than the predetermined wavelength of the terahertz wave.

Accordingly, terahertz waves having the predetermined wavelength can be detected with high accuracy.

In the terahertz wave detection device according to the aspect of the invention, it is preferable that the predetermined pitch of the plurality of holes be equal to the predetermined wavelength of the terahertz wave.

Accordingly, terahertz waves having the predetermined wavelength can be detected with high accuracy.

In the terahertz wave detection device according to the aspect of the invention, it is preferable that the wavelength filter have a first area in which the plurality of holes are formed with a first pitch along a direction that is perpendicular to the normal line of the incident surface, and a second area in which the plurality of holes are formed with a second pitch along the direction that is perpendicular to the normal line of the incident surface.

Accordingly, terahertz waves having the predetermined plural wavelengths can be detected.

In the terahertz wave detection device according to the aspect of the invention, it is preferable that the wavelength filter have plural unit areas, and the plural unit areas includes a first area in which the plurality of holes are formed with a first pitch along a direction that is perpendicular to the normal line of the incident surface, and a second area in which the plurality of holes are formed with a second pitch along the direction that is perpendicular to the normal line of the incident surface.

Accordingly, terahertz waves having the predetermined plural wavelengths can be detected.

In the terahertz wave detection device according to the aspect of the invention, it is preferable that the detection portion includes plural unit detection portions which are installed to correspond to the first area and the second area of the wavelength filter, and detect terahertz waves that have passed through the corresponding area by converting the terahertz waves into heat.

Accordingly, terahertz waves having the predetermined plural wavelengths can be detected.

Another aspect of the invention is directed to a terahertz wavelength filter transmitting terahertz waves having a predetermined wavelength, which includes a metal layer having a plurality of holes communicating with an incident surface onto which terahertz waves are incident and an emission surface from which terahertz waves having the predetermined wavelength are emitted; and a dielectric portion filling in the plurality of holes and made of a dielectric, wherein the plurality of holes are formed with a predetermined pitch along a direction that is perpendicular to a normal line of the incident surface.

Accordingly, a terahertz wavelength filter which is miniaturized in comparison to the related art can be provided.

Still another aspect of the invention is directed to an imaging device, which includes a terahertz wave generation device generating terahertz waves; a terahertz wave detection device detecting terahertz waves that are emitted from the terahertz wave generation device and penetrate or are reflected from an object; and an image generation unit generating an image of the object based on the result of the detection performed by the terahertz wave detection device, wherein the terahertz wave detection device includes a wavelength filter transmitting terahertz waves having a predetermined wavelength; and a detection portion detecting terahertz waves having the predetermined wavelength that have passed through the wavelength filter by converting the terahertz waves into heat, wherein the wavelength filter includes a metal layer having a plurality of holes communicating with an incident surface onto which the terahertz wave that is emitted from the terahertz wave generation device is incident and an emission surface from which the terahertz waves having the predetermined wavelength are emitted; and a dielectric portion filling in the plurality of holes and made of a dielectric, and wherein the plurality of holes are formed with a predetermined pitch along a direction that is perpendicular to a normal line of the incident surface.

Accordingly, an imaging device which is miniaturized in comparison to the related art can be provided.

Yet another aspect of the invention is directed to a measurement device, which includes a terahertz wave generation device generating terahertz waves; a terahertz wave detection device detecting the terahertz waves that are emitted from the terahertz wave generation device and penetrate or are reflected from an object; and a measurement unit measuring the object based on the result of the detection performed by the terahertz wave detection device, wherein the terahertz wave detection device includes a wavelength filter transmitting terahertz waves having a predetermined wavelength; and a detection portion detecting the terahertz waves having the predetermined wavelength that have passed through the wavelength filter by converting the terahertz waves into heat, wherein the wavelength filter includes a metal layer having a plurality of holes communicating with an incident surface onto which the terahertz waves that are emitted from the terahertz wave generation device are incident and an emission surface from which the terahertz waves having the predetermined wavelength are emitted; and a dielectric portion filling in the plurality of holes and made of a dielectric, and wherein the plurality of holes are formed with a predetermined pitch along a direction that is perpendicular to a normal line of the incident surface.

Accordingly, a measurement device which is miniaturized in comparison to the related art can be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a terahertz wave detection device, an imaging device, and a measurement device according to preferred embodiments of the invention will be described in detail with reference to the accompanying drawings.

First Embodiment

Figure 1:
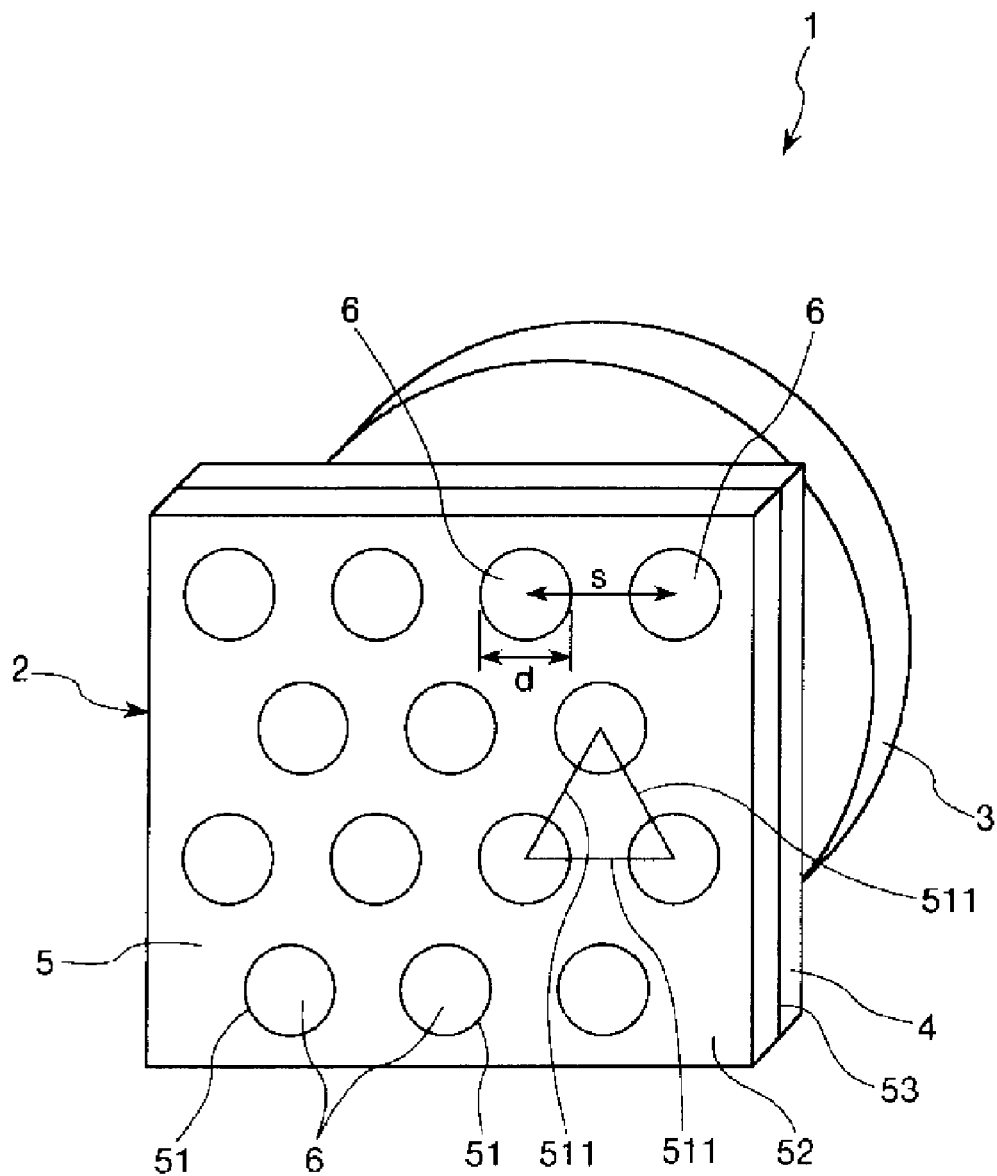
FIG. 1 is a perspective view schematically illustrating a terahertz wave detection device according to a first embodiment of the invention.

FIG. 1 is a perspective view schematically illustrating a terahertz wave detection device according to a first embodiment of the invention.

The terahertz wave detection device 1 illustrated in FIG. 1 is a device that detects a predetermined frequency component of a terahertz wave, that is, a terahertz wave having a predetermined wavelength. In this case, the predetermined wavelength is a wavelength having an intensity to be detected by a detection portion 3 to be described later. This terahertz wave detection device 1 includes a wavelength filter 2 transmitting a terahertz wave having a predetermined wavelength and the detection portion 3 detecting the terahertz wave having the predetermined wavelength that has passed through the wavelength filter 2 by converting the terahertz wave into heat. Further, in the terahertz wave detection device 1, the positional relationship between the wavelength filter 2 and the detection portion 3 is fixed. For example, the wavelength filter 2 and the detection portion 3 have been integrated.

In this case, the terahertz wave is an electromagnetic wave having a frequency that is equal to or greater than 100 GHz and equal to or less than 30 THz, and particularly, an electromagnetic wave having a frequency that is equal to or greater than 300 GHz and equal to or less than 3 THz.

The wavelength filter 2 of the terahertz wave detection device 1 includes a substrate 4, a metal film (metal layer) 5 installed on the terahertz wave incident side of the substrate 4 and having a plurality of holes (through-holes) 51, and a filler (dielectric portion) 6 filling in the respective holes 51 and made of dielectric. The metal film 5 has an incident surface 52 to which the terahertz wave is incident and an emission surface 53 from which the terahertz wave that has penetrated the metal layer 5 is emitted, and the plurality of holes 51 communicably connect the incident surface 52 and the emission surface 53. The substrate 4 is installed on the emission side of the terahertz wave of the metal film 5.

The shape of the substrate 4 is not specifically limited, and the shape as seen from the plane in the thickness direction, for example, may be a polygon such as a tetragon, a circle, an elliptical shape, or the like. In the illustrated configuration, the shape as seen from the plane in the thickness direction of the substrate 4 is a tetragon.

Further, the dimensions of the substrate 4 are not particularly limited, and are appropriately set according to the usage or terms and conditions. It is preferable that the length of one side of the substrate 4 is equal to or greater than 1 μm and equal to or less than 10 cm, and it is more preferable that the length of one side of the substrate 4 be equal or greater than 10 μm and equal to or less than 1 cm. The thickness of the substrate 4 is preferably equal to or greater than 10 nm and equal to or less than 10 cm, and more preferably equal to or greater than 100 nm and equal to or less than 1 cm.

Further, the constituent materials of the substrate 4 may be anything other than metal, and, for example, may be various kinds of resin materials, insulators such as silica, a semiconductor, and the like. In this case, it is preferable that the substrate 4 have insulation properties.

Using the substrate 4, the structural strength of the wavelength filter 2 is improved, and thus the reliability can be improved.

The outer shape of the metal film 5 corresponds to the outer shape of the substrate 4. Further, the respective holes 51 formed in the metal film 5 are two-dimensionally arranged, and are regularly arranged. The shape of the respective holes 51 is not particularly limited, and for example, may be a circle, an elliptical shape, a polygon such as a tetragon, a straight line, a curved line, a bent line, and the like. In the illustrated configuration, the shape of each hole 51 is a circle, and hereinafter, as the conditions of the hole 51, typically, a case where the shape of the hole 51 is a circle will be described.

In the respective holes 51, the distance between the centers of two neighboring holes 51 as seen from the plane in the direction of the normal line of the incident surface 52 is set according to the wavelength (hereinafter also referred to as a "pass wavelength") of the terahertz wave that passes through the wavelength filter 2. That is, the respective holes may be formed to be periodically arranged with a predetermined pitch according to the direction that is perpendicular to the normal line of the incident surface 52. The distance between the centers of the two neighboring holes 51 is set to be equal to the pass wavelength. Accordingly, the terahertz wave having the predetermined wavelength can pass through with high accuracy, and by the detection portion 3, a terahertz wave having the predetermined wavelength can be detected with high accuracy.

In the illustrated configuration, the respective holes 51 are arranged in a manner that three straight lines 511 that connect the centers of the two neighboring holes 51 form a regular triangle, and respective regular triangles are regularly arrayed. That is, the respective holes 51 are arranged in the form of a lattice of regular triangles.

Further, it is preferable that the respective holes are installed to satisfy the following equation (1) on the assumption that the diameter of each hole 51 is d and the distance between the centers of two neighboring holes 51 (the pitch of the holes 51) is s.

$$0.25 \leq d/s < 1 \tag{1}$$

If d/s is less than 0.25, according to other conditions, the terahertz wave may not pass through the metal film 5. Further, if d/s is equal to or greater than 1, the two neighboring holes 51 contact or communicate with each other. Further, when d/s is 0.25, the wavelength filter 2 has the best accuracy. However, as d/s becomes larger, the accuracy is reduced.

In this case, d/s is preferably equal to or greater than 0.25 and less than 1, and more preferably equal to or greater than 0.25 and equal to or less than 0.5.

Further, since the accuracy becomes better as the diameter d of the hole 51 becomes smaller, it is preferable that the diameter d be set to be as small as possible in a range that satisfies the above-described equation (1).

Specifically, the diameter d of each hole 51 is preferably equal to or greater than 0.1 μm and less than 3 mm, more preferably equal to or greater than 1 µm and less than 300 µm, and most preferably equal to or greater than 10 µm and less than 30 µm. Further, the distance s between the centers of two neighboring holes 51 is preferably equal to or greater than 0.1 µm and equal to or less than 3 mm, more preferably equal to or greater than 1 µm and equal to or less than 300 µm, and most preferably equal to or greater than 10 µm and equal to or less than 30 µm.

Further, the thickness of the metal film 5 (the length in the direction of the normal line of the incident surface 52) is preferably equal to or less than the wavelength of the terahertz wave that passes through the wavelength filter 2. Accordingly, a terahertz wave having the predetermined wavelength can be detected with high accuracy.

Specifically, the thickness of the metal film 5 is preferably equal to or less than 3 mm, more preferably equal to or less than 1 mm, most preferably equal to or less than 100 µm, and particularly preferably equal to or greater than 10 nm and equal to or less than 100 µm.

Further, the constituent material of the metal film 5 is not particularly limited if it is a metal, and may be aluminum, aluminum alloys, gold, gold alloys, silver, silver alloys, stainless steel, or the like.

In the case where the shape of each hole 51 is non-circular, the length of the longest region of each hole 51 corresponds to the diameter d. For example, if the shape of each hole 51 is elliptical, the long diameter corresponds to the diameter d, while if the shape of each hole 51 is a polygon, the longest diagonal line corresponds to the diameter d.

A filler 6 composed of dielectric fills in the holes 51 of the metal film 5. Since the dielectric constant of the filler 6 is greater than 1, the propagation velocity of the terahertz wave that is incident to and exists the filler 6 slows down. Since the propagation velocity and the wavelength in the propagation path are proportional to each other, the wavelength of the terahertz wave that propagates through the filler 6 becomes smaller due to the slowing of the propagation velocity. In designing the wavelength filter 2, according to the wavelength that propagates inside the wavelength filter 2, the pitch s of the holes 51 or the diameter d of the holes 51 is set. That is, the area of the wavelength filter 2 may be reduced through reduction of the wavelength of the terahertz wave that propagates through the filler 6. Accordingly, the terahertz wave detection device can be miniaturized.

The dielectric constant of the filler 6 is greater than the dielectric constant of the substrate 4 and the metal film 5. Specifically, the relative dielectric constant of the filler 6 is preferably equal to or greater than 50, more preferably equal to or greater than 50 and equal to or less than 200, and most preferably equal to or greater than 80 and equal to or less than 120. Accordingly, the wavelength of the terahertz wave that propagates through the wavelength filter 2 can be further reduced, and thus the terahertz wave detection device can be miniaturized.

Further, the dielectric that forms the filler 6 is not particularly limited, and it is preferable that the dielectric include, for example, at least one of metal oxide, metal carbide, and metal nitride. Further, it is preferable that the metal of the metal oxide, the metal carbide, and the metal nitride belong to any one of group 3, group 4, and group of the periodic table of elements. Accordingly, the wavelength of the terahertz wave that propagates through the wavelength filter 2 is reduced, and thus the terahertz wave detection device can be miniaturized.

The constituent material of the filler 6, for example, may be nitrogen incorporated hafnium aluminate, hafnium oxide, yttrium oxide, lanthanum oxide, niobium oxide, and titanium oxide, or the like.

The detection portion 3 is arranged on the emission side of the terahertz wave of the wavelength filter 2. The detection portion 3 may detect the terahertz wave through conversion of the terahertz wave into heat, or may convert the terahertz wave into heat and may detect energy (intensity) of the terahertz wave. The detection portion 3, for example, may be a pyroelectric sensor or a bolometer.

Next, the operation of the terahertz wave detection device 1 will be described.

If the terahertz wave is incident to the metal film of the wavelength filter 2 of the terahertz wave detection device 1, the terahertz wave having the specified wavelength passes through the wavelength filter 2. In this case, most of the terahertz wave (other than the terahertz wave having the predetermined wavelength) can be cut off. Further, in the wavelength filter 2, the terahertz wave is compressed by the filler 6 filling in the holes 51 and thus the wavelength of the terahertz wave is shortened. Accordingly, the terahertz wavelength detection device can be miniaturized.

Next, the terahertz wave having the predetermined wavelength that has passed through the wavelength filter 2 is incident to the detection portion 3. The detection portion 3 is provided with an absorption layer (not illustrated) that efficiently absorbs the terahertz wave having the predetermined wavelength, and detects the terahertz wave incident to the detection portion 3 through conversion of the terahertz wave into heat. That is, in the detection portion 3, the terahertz wave is converted into heat, and the energy of the terahertz wave is detected. A signal that indicates the result of the detection, for example, is sent to an external device such as a personal computer (not illustrated) that is connected to the detection portion 3.

As described above, according to the terahertz wave detection device 1, the terahertz wave is compressed by the filler 6 that fills in the holes 51 of the wavelength filter 2 to reduce its wavelength, and thus the area of the wavelength filter 2 can be reduced. Accordingly, the terahertz wave detection device can be miniaturized. Further, since the area of the wavelength filter 2 is reduced, the space between the wavelength filters 2 can be reduced in the case where plural wavelength filters 2 are installed. That is, since the space between the plural detection portions 3 which are installed to correspond to the wavelength filters 2 can be reduced, the resolution of the terahertz wave detection device can be heightened.

In the embodiment of the invention, the substrate 4 may be omitted.

Second Embodiment

Figure 2:
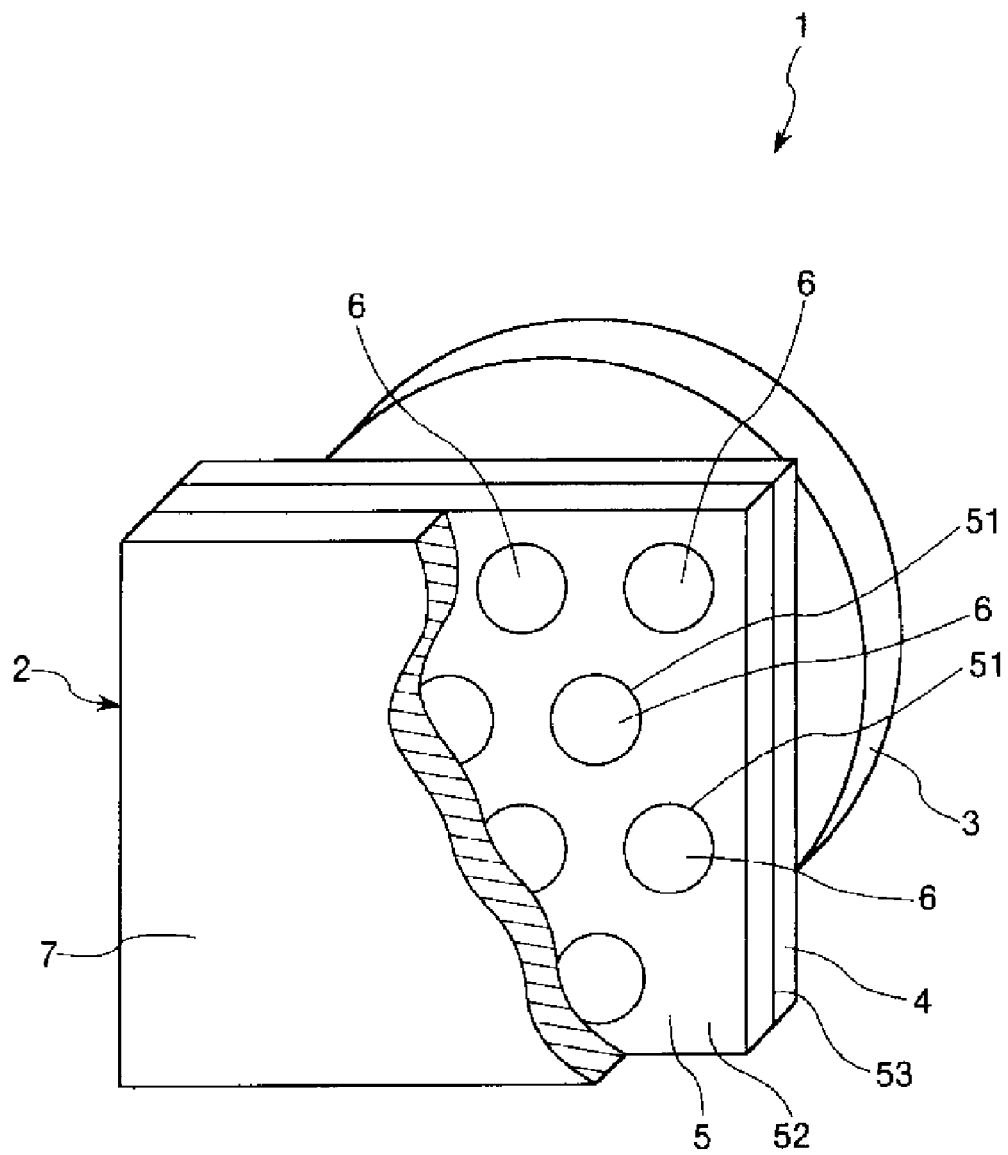
FIG. 2 is a perspective view schematically illustrating a terahertz wave detection device according to a second embodiment of the invention.

FIG. 2 is a perspective view schematically illustrating a terahertz wave detection device according to a second embodiment of the invention.

Hereinafter, the second embodiment will be described focusing mainly on the difference from the first embodiment as described above, and an explanation of the common features will be omitted. Further, with respect to the same configurations as the first embodiment, the same reference numerals as the above-described embodiment are given, and the detailed description thereof will be omitted.

As illustrated in FIG. 2, in the terahertz wave detection device 1 according to the second embodiment, the wavelength filter 2 has a coated film (dielectric layer) 7 which is installed (applied) on the surface of the incident side of the terahertz wave of the metal film 5 and is made of dielectric. This coated film 7 compresses the wavelength of the terahertz wave that is incident to the wavelength filter 2. Accordingly, since the wavelength of the terahertz wave has been compressed when the terahertz wave is incident to the respective holes 51 of the wavelength filter 2, a terahertz wave having the predetermined wavelength can pass through the wavelength filter 2 with high accuracy. Accordingly, a terahertz wave having the predetermined wavelength can be detected with high accuracy.

The dielectric constant of the coated film 7 is greater than the dielectric constant of the substrate 4 and the metal film 5. Specifically, the relative dielectric constant of the coated film 7 is preferably equal to or greater than 50, more preferably equal to or greater than 50 and equal to or less than 200, and most preferably equal to or greater than 80 and equal to or less than 120. Accordingly, the wavelength of the terahertz wave that propagates through the wavelength filter 2 can be further reduced, and thus the terahertz wave detection device can be miniaturized.

Further, the dielectric that forms the coated film 7 is not particularly limited, and it is preferable that the dielectric include, for example, at least one of metal oxide, metal carbide, and metal nitride. Further, it is preferable that the metal of the metal oxide, the metal carbide, and the metal nitride belong to any one of group 3, group 4, and group of the periodic table of elements. Accordingly, the wavelength of the terahertz wave that propagates through the wavelength filter 2 can be reduced, and thus the terahertz wave detection device can be miniaturized.

The constituent material of the coated film 7, for example, may be nitrogen incorporated hafnium aluminate, hafnium oxide, yttrium oxide, lanthanum oxide, niobium oxide, and titanium oxide, or the like.

Further, the thickness of the coated film 7 is not particularly limited, and it is preferable that the thickness is preferably equal to or greater than 10 nm and equal to or less than 1 mm, and more preferably equal to or greater than 100 nm and equal to or less than 100 μm.

In this case, the composition of the dielectric that forms the coated film 7 may be the same as or may be different from the composition of the dielectric that forms the filler 6.

Further, the relative dielectric constant of the coated film 7 and the relative dielectric constant of the filler 6 may be the same as or may be different from each other. However, it is preferable that they be different from each other. Further, it is preferable to set the relative dielectric constant of the filler 6 to be greater than the relative dielectric constant of the coated film 7. Accordingly, a terahertz wave having the predetermined wavelength can pass through the wavelength filter 2 more reliably.

The second embodiment can be applied to a third embodiment and a fourth embodiment to be described later.

Third Embodiment

Figure 3:
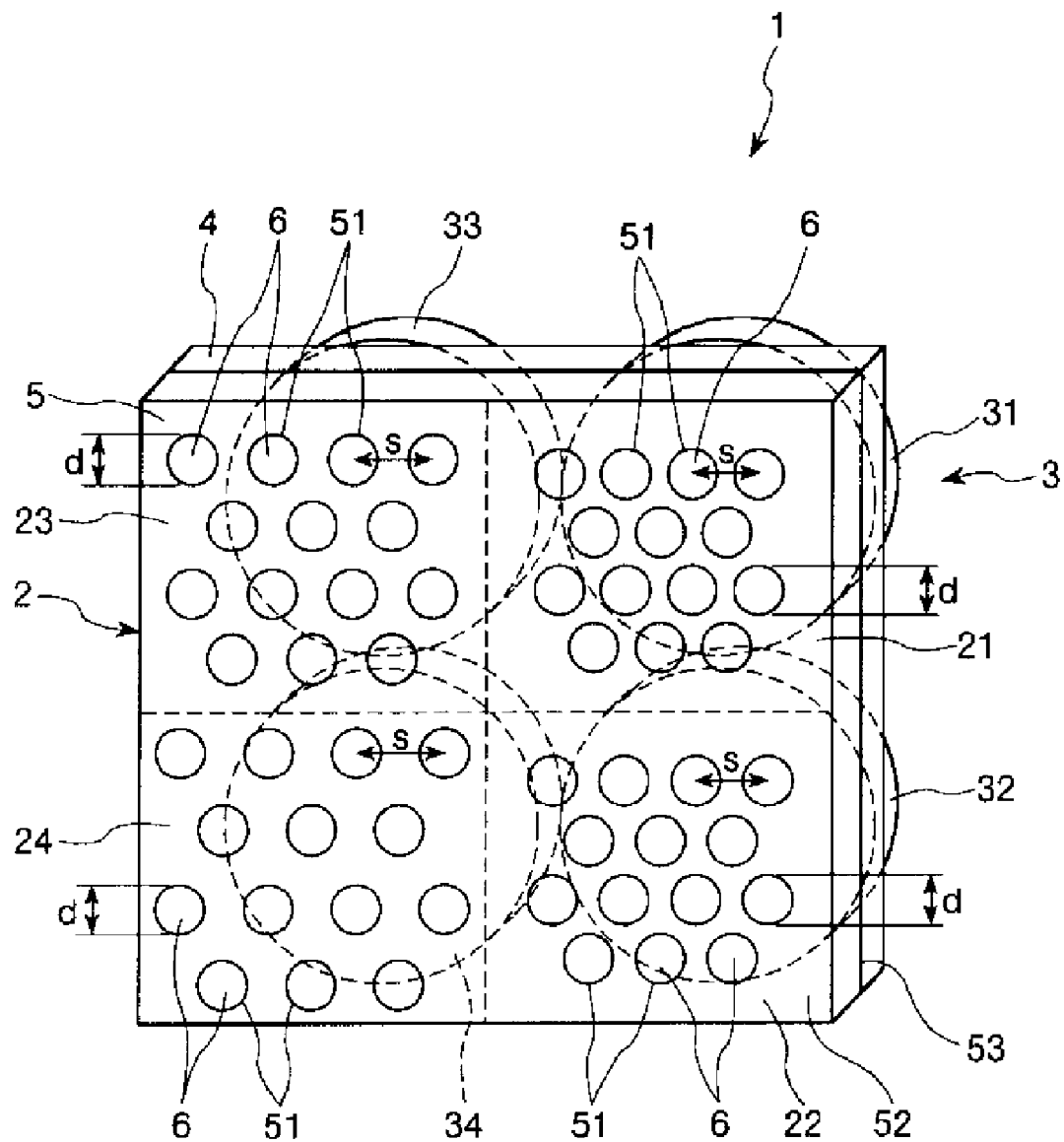
FIG. 3 is a perspective view schematically illustrating a terahertz wave detection device according to a third embodiment of the invention.

FIG. 3 is a perspective view schematically illustrating a terahertz wave detection device according to a third embodiment of the invention. In FIG. 3, boundaries of a first area 21, a second area 22, a third area 23, and a fourth area 24 of the wavelength filter 2 are indicated by dashed lines.

Hereinafter, the third embodiment will be described focusing mainly on the difference from the first embodiment as described above, and an explanation of the common features will be omitted. Further, with respect to the same configurations as the first embodiment, the same reference numerals as the above-described embodiment are given, and the detailed description thereof will be omitted.

As illustrated in FIG. 3, in the terahertz wave detection device 1 according to the third embodiment, the wavelength filter 2 includes plural areas, that is, the first area 21, the second area 22, the third area 23, and the fourth area 24, in which the distances between the centers of the two neighboring holes 51 are different from each other and which transmit terahertz waves having different wavelengths.

In the illustrated configuration, the first area 21, the second area 22, the third area 23, and the fourth area 24 have the same shape, that is, have a tetragonal shape, and have the same dimensions. Further, the first area 21 is arranged on an upper portion on the right side in FIG. 3, the second area 22 is arranged on a lower portion on the right side in FIG. 3, the third area 23 is arranged on an upper portion on the left side in FIG. 3, and the fourth area 24 is arranged on a lower portion on the left side in FIG. 3. Further, as seen from the plane in the direction of the normal line of the incident surface 52, the distance between the centers of the two neighboring holes 51 (pitch of the holes 51) is set to s1 in the first area 21, s2 in the second area 22, s3 in the third area 23, and s4 in the fourth area 24, and the relationship among them is s1<s2<s3<s4. Further, the pass wavelength is set to be longer in the order of the fourth area 24, the third area 23, the second area 22, and the first area 21.

In this case, the diameter of the holes 51 of the first area 21, the diameter of the holes 51 of the second area 22, the diameter of the holes 51 of the third area 23, and the diameter of the holes 51 of the fourth area 24 may be equal to or different from each other. In the illustrated configuration, they are set to be equal to each other.

Further, the detection portion 3 includes a first unit detection portion 31, a second unit detection portion 32, a third unit detection unit 33, and a fourth unit detection portion 34, which are installed to correspond to the first area 21, the second area 22, the third area 23, and the fourth area 24 of the wavelength filter 2. The first unit detection portion 31, the second unit detection portion 32, the third unit detection portion 33, and the fourth unit detection portion 34 detect the terahertz waves that have passed through the first area 21, the second area 22, the third area 23, and the fourth area 24 through conversion of the terahertz waves into heat. Accordingly, the terahertz waves having four desired wavelengths can be detected.

Further, in the same manner as the second embodiment, it is preferable that even in the terahertz wave detection device 1 according to this embodiment, the wavelength filter 2 have the coated film 7 that is installed on the surface on the incident side of the terahertz wave of the metal film 5 and made of dielectric.

In the invention, the number of areas that transmit the terahertz waves having different wavelengths or the number of unit detection portions is determined according to the number of wavelengths of the terahertz wave that are desired to be detected. For example, the number may not be limited to four, and may be 2, 3, or 5 or more.

Fourth Embodiment

Figure 4A:
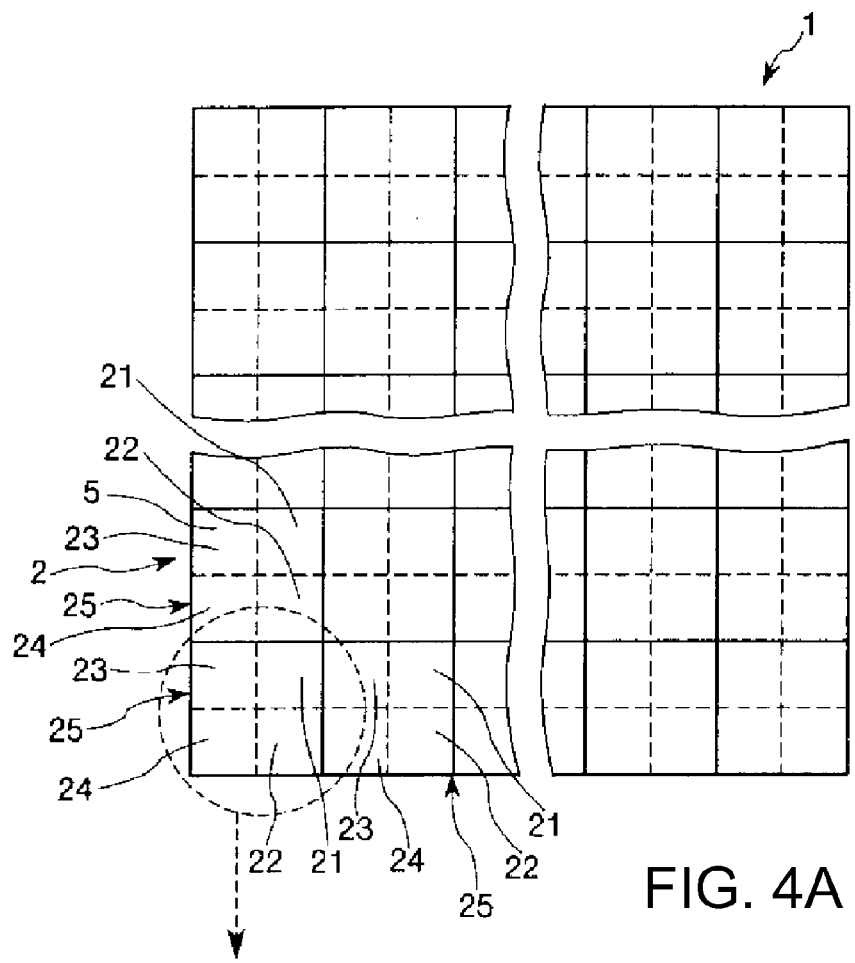
FIGS. 4A and 4B are respectively a plan view and a perspective view schematically illustrating a terahertz wave detection device according to a fourth embodiment of the invention.
Figure 4B:
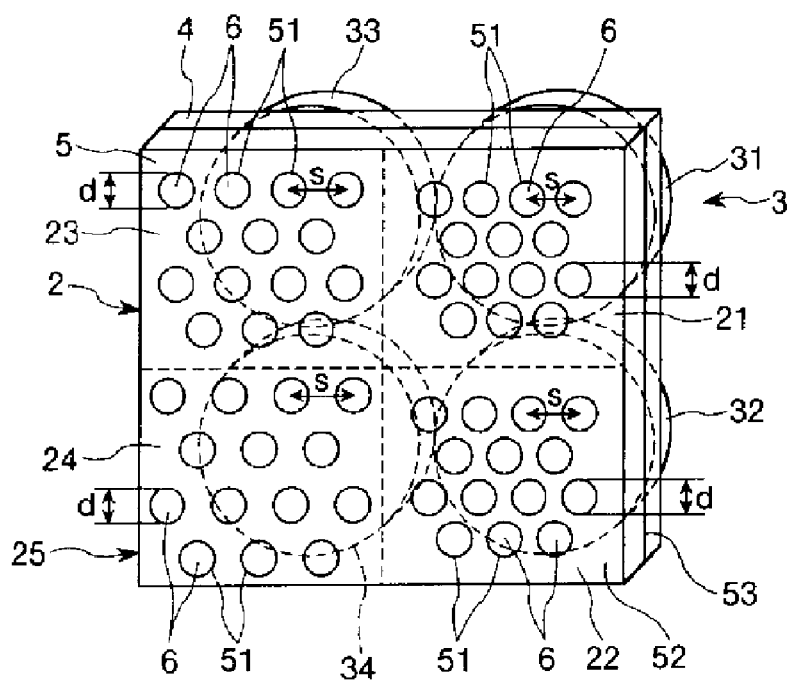

FIGS. 4A and 4B are a plan view and a perspective view schematically illustrating a terahertz wave detection device according to a fourth embodiment of the invention.

In FIG. 4A, boundaries of the first area 21, the second area 22, the third area 23, and the fourth area 24 of the wavelength filter 2 are indicated by dashed lines, and the boundary of two neighboring pixels (unit area) 25 is indicated by a solid line. Further, FIG. 4B is an enlarged view of a region that is surrounded by the dashed line in FIG. 4A. In FIG. 4A, the hole 51 and the filler 6 are omitted.

Hereinafter, the fourth embodiment will be described focusing mainly on the difference from the third embodiment as described above, and an explanation of the common features will be omitted. Further, with respect to the same configurations as the above-described embodiment, the same reference numerals as the above-described embodiment are given, and the detailed description thereof will be omitted.

As illustrated in FIG. 4A, in the terahertz wave detection device 1 according to the fourth embodiment, the wavelength filter 2 includes plural pixels (unit areas) 25 which are two-dimensionally arranged. That is, the respective pixels 25 are arranged in the form of a matrix.

Further, the respective pixels 25 correspond to the wavelength filter 2 in the third embodiment. That is, each pixel 25 includes plural areas, that is, the first area 21, the second area 22, the third area 23, and the fourth area 24, in which distances between centers of two neighboring holes 51 are different from each other and which transmit terahertz waves having different wavelengths. In this case, since the first area 21, the second area 22, the third area 23, and the fourth area 24 are the same as those in the third embodiment, the description thereof will be omitted.

Further, the detection portion 3 includes the first unit detection portion 31, the second unit detection portion 32, the third unit detection unit 33, and the fourth unit detection portion 34, which are installed to correspond to the first area 21, the second area 22, the third area 23, and the fourth area 24 of each pixel 25 of the wavelength filter 2. The first unit detection portion 31, the second unit detection portion 32, the third unit detection portion 33, and the fourth unit detection portion 34 detect the terahertz waves that have passed through the first area 21, the second area 22, the third area 23, and the fourth area 24 of each pixel 25 through conversion of the terahertz waves into heat. Accordingly, in the respective pixels 25, the respective terahertz waves having four predetermined wavelengths can be detected.

In the wavelength filter 2 of the terahertz wave detection device 1 of this embodiment, the same unit areas including the first area 21, the second area 22, the third area 23, and the fourth area 24 are arranged, but the invention is not limited thereto. For example, if the first area 21, the second area 22, the third area 23, and the fourth area 24 are included in the respective unit areas, the arrangements of the respective areas in the unit area may not be equal to each other. Further, the number of areas included in the unit area or the number of unit detection portions is determined according to the number of wavelengths of the terahertz wave that are desired to be detected. For example, the number may not be limited to four, and may be 2, 3, or 5 or more.

Further, in the same manner as the second embodiment, it is preferable that even in the terahertz wave detection device 1 according to this embodiment, the wavelength filter 2 have the coated film 7 that is installed on the surface on the incident side of the terahertz wave of the metal film 5 and made of dielectric.

In the invention, the pixels 25 of the wavelength filter 2, for example, may be one-dimensionally arranged in a linear shape.

Embodiment of an Imaging Device

Figure 5:
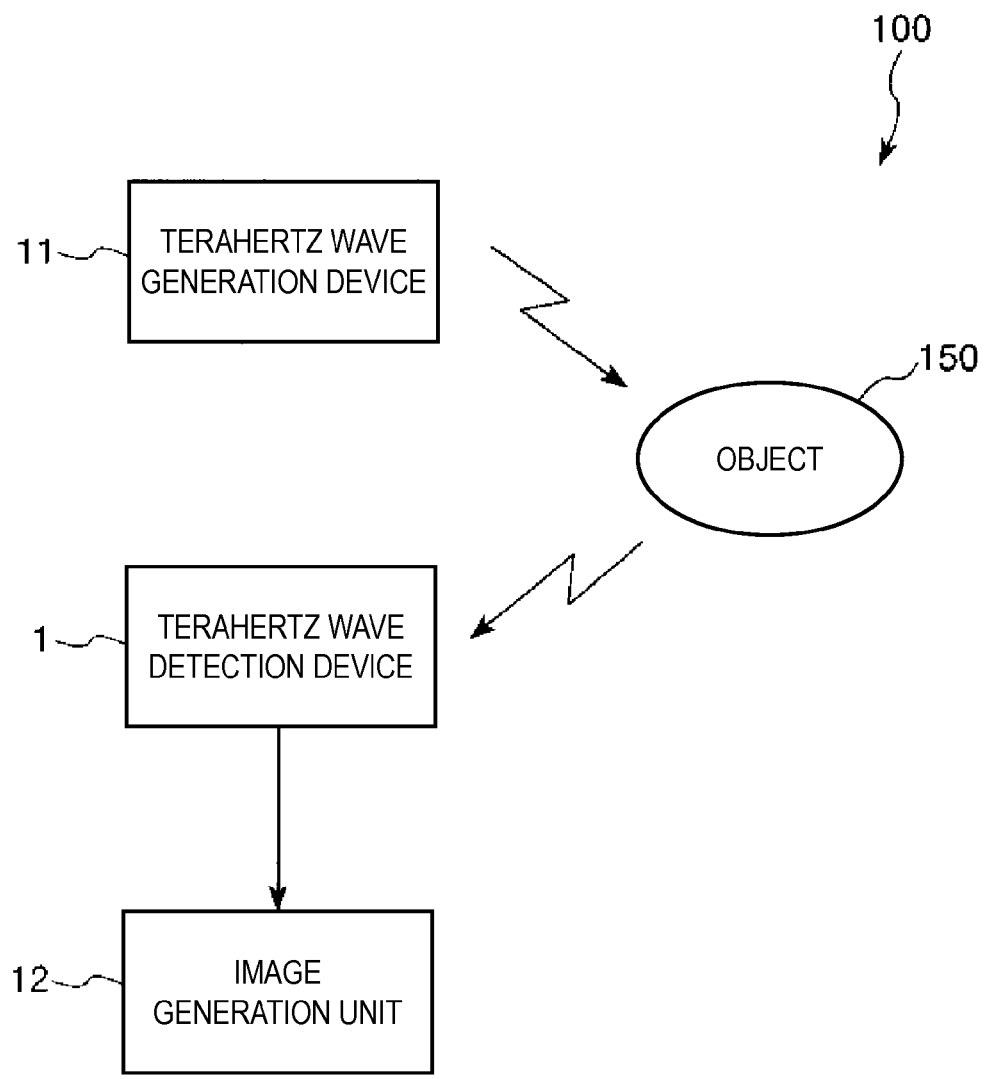
FIG. 5 is a block diagram of an imaging device according to an embodiment of the invention.

FIG. 5 is a block diagram illustrating an imaging device according to an embodiment of the invention.

As illustrated in FIG. 5, the imaging device 100 includes a terahertz wave generation device 11 generating a terahertz wave, a terahertz wave detection device 1 detecting the terahertz wave that is emitted from the terahertz wave generation device 11 and penetrates or is reflected from an object 150, and an image generation unit 12 generating an image of the object 150, that is, image data, based on the result of the detection performed by the terahertz wave detection device 1.

As the terahertz wave detection device 1, in this embodiment, the one in the fourth embodiment may be used. In this case, with respect to the same configurations as the above-described embodiment, the same reference numerals as the above-described embodiment are given, and the detailed description thereof will be omitted.

Further, the terahertz wave generation device 11, for example, may be a quantum cascade laser, a system using a photoconductive antenna and a short-pulse laser, or a difference frequency generation system using non-linear optical crystal.

Next, an exemplary use of the imaging device 100 will be described.

First, the object 150 that is the subject of spectral imaging is composed of three materials A, B, and C. The imaging device 100 performs spectral imaging of the object 150. Here, as an example, the terahertz wave detection device 1 detects the terahertz waves that are reflected from the object 150.

Figure 6:
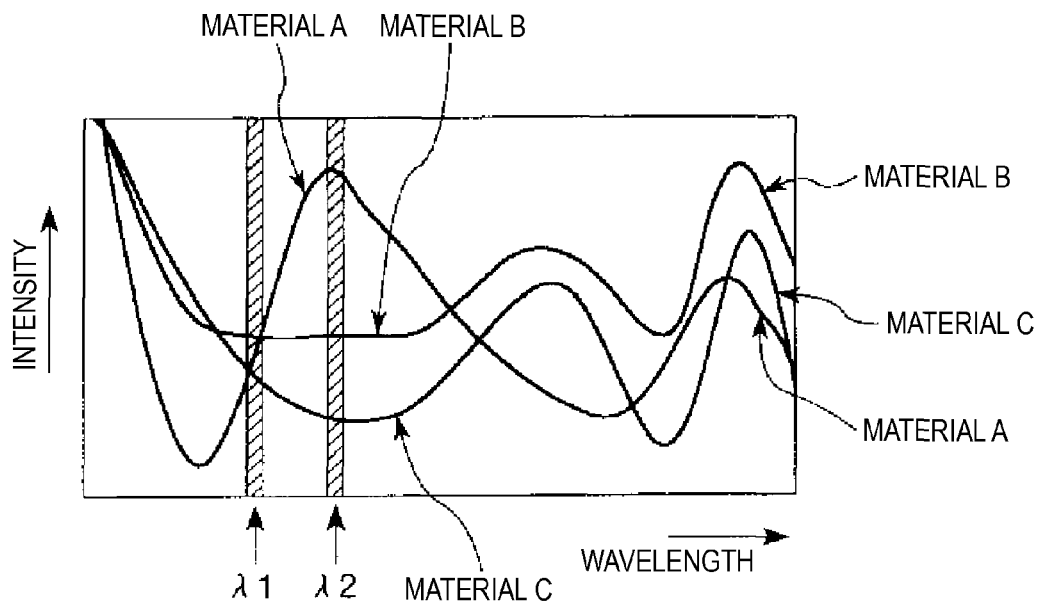
FIG. 6 is a graph illustrating spectrums in a terahertz band of an object of the imaging device illustrated in FIG. 5.

FIG. 6 is a graph illustrating spectrums in the terahertz band of the object 150.

In each pixel 25 of the wavelength filter 2 of the terahertz wave detection device 1, the first area 21 and the second area 22 are used.

Further, if it is assumed that the pass wavelength of the first area 21 is λ1, the pass wavelength of the second area 22 is λ2, the intensity of a component of the wavelength λ1 of the terahertz wave that is reflected from the object 150 is α1, and the intensity of a component of the wavelength λ2 is α2, the path wavelength λ1 of the first area 21 and the pass wavelength λ2 of the second area 22 are set so that the difference (α2-α1) between the intensity α2 and the intensity α1 can be remarkably distinct with respect to the materials A, B, and C.

As illustrated in FIG. 6, the difference (α2-α1) between the intensity α2 of the component of the wavelength λ2 of the terahertz wave that is reflected from the object 150 and the intensity α1 of the component of the wavelength λ1 becomes a positive value with respect to the material A.

Further, the difference (α2-α1) between the intensity α2 and the intensity α1 becomes 0 with respect to the material B.

Further, the difference (α2-α1) between the intensity α2 and the intensity α1 becomes a negative value with respect to the material C.

When the spectral imaging of the object 150 is performed by the imaging device 100, first, the terahertz wave is generated by the terahertz wave generation device 11, and the generated terahertz wave is irradiated onto the object 150. Further, the terahertz waves reflected from the object 150 are detected as α1 and α2 by the terahertz wave detection device 1. The result of this detection is sent to the image generation unit 12. In this case, the irradiation of the terahertz wave onto the object 150 and the detection of the terahertz wave that is reflected from the object 150 are performed with respect to the entire object 150.

Based on the result of the detection, the image generation unit 12 obtains the difference (α2-α1) between the intensity α2 of the component of the wavelength λ2 of the terahertz wave that has passed through the second area 22 of the wavelength filter 2 and the intensity α1 of the component of the wavelength λ1 of the terahertz wave that has passed through the first area 21. Thereafter, the image generation unit 12 determines and identifies that a region of the object 150 in which the difference becomes a positive value is material A, a region in which the difference becomes 0 is material B, and a region in which the difference becomes a negative value is material C.

Figure 7:
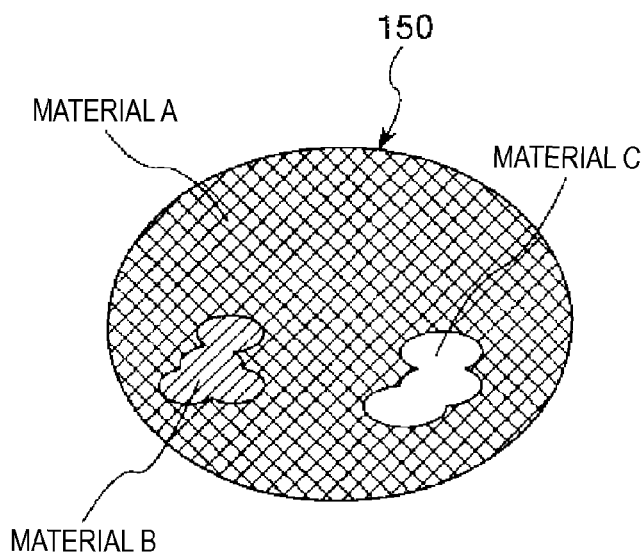
FIG. 7 is a diagram illustrating an image that indicates the distribution of materials A, B, and C of an object.

Further, as illustrated in FIG. 7, the image generation unit 12 prepares image data of an image that indicates distribution of the materials A, B, and C of the object 150. This image data is sent from the image generation unit 12 to a monitor (not illustrated), and the image that indicates the distribution of the materials A, B, and C of the object 150 is displayed on the monitor. In this case, for example, the area in which the material A of the object 150 is distributed appears black, the area in which the material B is distributed appears gray, and the area in which the material C is distributed appears white, respectively. As described above, the imaging device 100 can simultaneously performs the identification of the respective materials that constitute the object 150 and the distribution measurement of the respective materials.

The use of the imaging device 100 is not limited to those as described above. For example, by irradiating a person with the terahertz wave, detecting the terahertz wave that penetrates or is reflected from the person, and performing the process through the image generation unit 12, it may be determined whether or not the person possesses a pistol, a knife, or illicit drugs.

Embodiment of a Measurement Device

Figure 8:
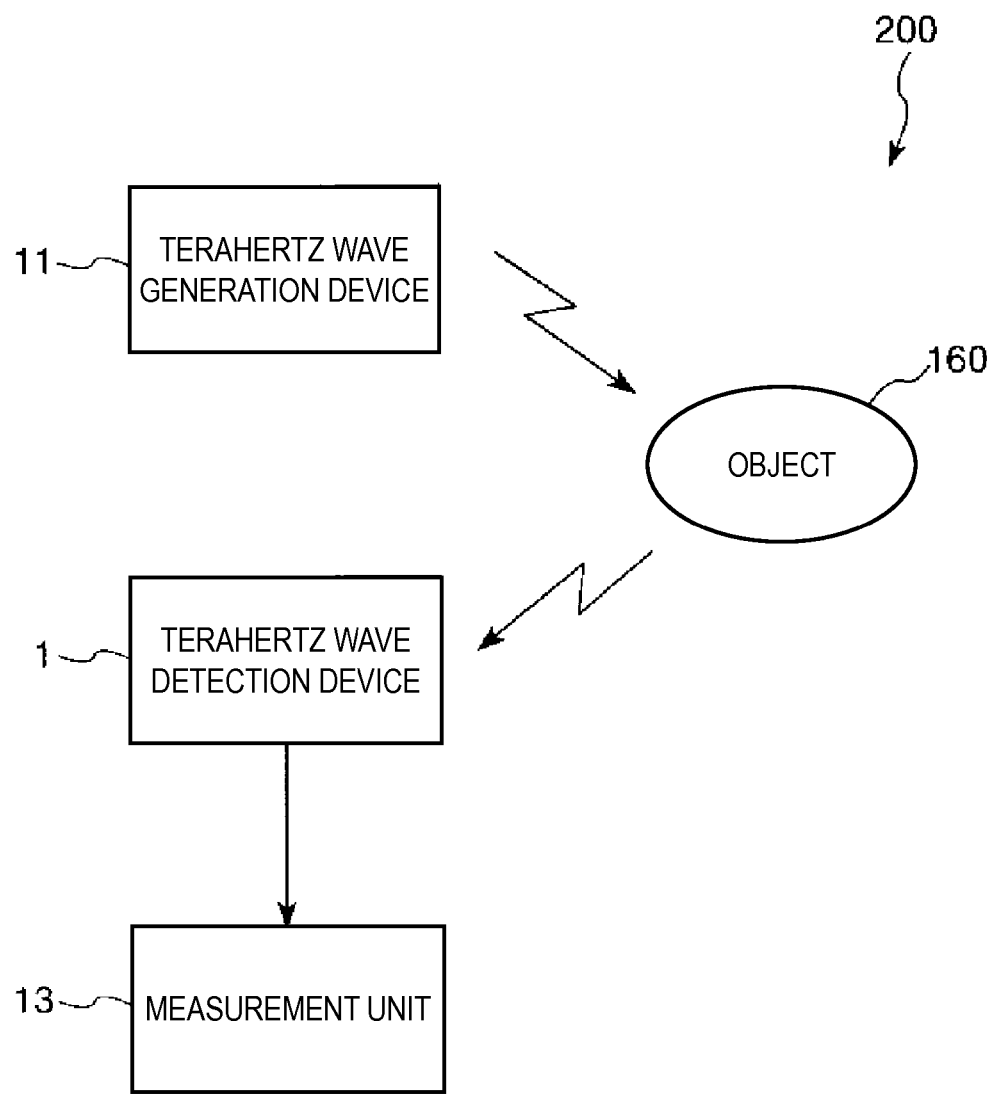
FIG. 8 is a block diagram illustrating a measurement device according to an embodiment of the invention.

FIG. 8 is a block diagram illustrating a measurement device according to an embodiment of the invention.

Hereinafter, the measurement device according to an embodiment will be described focusing mainly on the difference from the imaging device according to the embodiment as described above, and explanation of the same features will be omitted.

As illustrated in FIG. 8, the measurement device 200 includes the terahertz wave generation device 11 generating the terahertz wave, the terahertz wave detection device 1 detecting the terahertz wave that is emitted from the terahertz wave generation device 11 and penetrates or is reflected from an object 160, and a measurement unit 13 measuring the object 160 based on the result of the detection performed by the terahertz wave detection device 1.

In this embodiment, the terahertz wave detection device 1 according to the fourth embodiment is used. In this case, with respect to the same configurations as the above-described embodiment, the same reference numerals as the above-described embodiment are given, and the detailed description thereof will be omitted.

Further, the terahertz wave generation device 11, for example, may be a quantum cascade laser, a system using a photoconductive antenna and a short-pulse laser, or a difference frequency generation system using non-linear optical crystal.

Next, an exemplary use of the measurement device 200 will be described.

When the spectral measurement of the object 160 is performed by the measurement device 200, first, the terahertz wave is generated by the terahertz wave generation device 11, and the generated terahertz wave is irradiated onto the object 160. Further, the terahertz wave that penetrates or is reflected from the object 160 is detected by the terahertz wave detection device 1. The result of this detection is sent to the measurement unit 13. In this case, the irradiation of the terahertz wave onto the object 160 and the detection of the terahertz wave that penetrates or is reflected from the object 160 are performed with respect to the whole object 160.

The measurement unit 13 grasps the respective intensities of the terahertz waves which have passed through the first area 21, the second area 22, the third area 23, and the fourth area 24 of the wavelength filter 2 from the result of the detection, and performs analysis of the components and the component distribution of the object 160.

Although the terahertz wave detection device, the imaging device, and the measurement device according to the invention have been described on the basis of the illustrated embodiments, the invention is not limited thereto. The configurations of the respective units may be replaced by any configurations having the same functions. Further, other configurations and processes may be added to the invention.

Further, the invention may be a combination of any two or more of configurations (features) of the above-described embodiments.

What is claimed is:

1. A terahertz wave detection device comprising:
a wavelength filter transmitting terahertz waves having a predetermined wavelength; and
a detection portion detecting the terahertz waves having the predetermined wavelength that have passed through the wavelength filter by converting the terahertz waves into heat,
wherein the wavelength filter includes:
a metal layer having a plurality of holes communicating with an incident surface onto which the terahertz waves are incident and an emission surface from which the terahertz waves having the predetermined wavelength are emitted; and
a dielectric portion filling in the plurality of holes and made of a dielectric, wherein the plurality of holes are formed with a predetermined pitch along a direction that is perpendicular to a normal line of the incident surface.

2. The terahertz wave detection device according to claim 1, wherein the wavelength filter has a dielectric layer installed on a surface of the incident surface of the metal layer and a surface on the incident surface side of the dielectric portion and made of dielectric.

3. The terahertz wave detection device according to claim 2, wherein a relative dielectric constant of the dielectric layer is equal to or greater than 50.

4. The terahertz wave detection device according to claim 2, wherein the dielectric that forms the dielectric layer includes at least one of metal oxide, metal carbide, and metal nitride.

5. The terahertz wave detection device according to claim 4, wherein the metal included in the dielectric that forms the dielectric layer belongs to any one of group 3, group 4, and group 5 of the periodic table of elements.

6. The terahertz wave detection device according to claim 1, wherein a relative dielectric constant of the dielectric portion is equal to or greater than 50.

7. The terahertz wave detection device according to claim 1, wherein the dielectric that forms the dielectric portion includes at least one of metal oxide, metal carbide, and metal nitride.

8. The terahertz wave detection device according to claim 7, wherein the metal included in the dielectric that forms the dielectric portion belongs to any one of group 3, group 4, and group 5 of the periodic table of elements.

9. The terahertz wave detection device according to claim 1, wherein the wavelength filter has a substrate installed on the emission surface side of the metal layer.

10. The terahertz wave detection device according to claim 1, wherein each hole of the plurality of holes is in a shape of a circle in a plan view, and
when a diameter of the circle is d and a distance between centers of the circles of two neighboring holes as seen from the plane in the direction of the normal line of the incident surface is s, the following formula is satisfied:

$0.25 \leq d/s < 1$.

11. The terahertz wave detection device according to claim 1, wherein a thickness in a direction of the normal line of the incident surface of the metal layer is equal to or less than the predetermined wavelength of the terahertz waves.

12. The terahertz wave detection device according to claim 1, wherein the predetermined pitch of the plurality of holes is equal to the predetermined wavelength of the terahertz wave.

13. The terahertz wave detection device according to claim 1, wherein the wavelength filter has a first area in which the plurality of holes are formed with a first pitch along the direction that is perpendicular to the normal line of the incident surface, and a second area in which the plurality of holes are formed with a second pitch along the direction that is perpendicular to the normal line of the incident surface.

14. The terahertz wave detection device according to claim 13, wherein the detection portion includes plural unit detection portions which are installed to correspond to the first area and the second area of the wavelength filter, and detect the terahertz waves that have passed through the corresponding area by converting the terahertz waves into heat.

15. The terahertz wave detection device according to claim 1, wherein
the wavelength filter has plural unit areas, and
the plural unit areas include a first area in which the plurality of holes are formed with a first pitch along the direction that is perpendicular to the normal line of the incident surface, and a second area in which the plurality of holes are formed with a second pitch along the direction that is perpendicular to the normal line of the incident surface.

16. A terahertz wavelength filter transmitting terahertz waves having a predetermined wavelength, comprising:
a metal layer having a plurality of holes communicating with an incident surface onto which the terahertz waves are incident and an emission surface from which the terahertz waves having the predetermined wavelength are emitted; and
a dielectric portion filling in the plurality of holes and made of a dielectric,
wherein the plurality of holes are formed with a predetermined pitch along a direction that is perpendicular to a normal line of the incident surface.

17. An imaging device comprising:
a terahertz wave generation device generating terahertz waves;
a terahertz wave detection device detecting the terahertz waves that are emitted from the terahertz wave generation device and penetrate or are reflected from an object; and
an image generation unit generating an image of the object based on the result of the detection performed by the terahertz wave detection device,
wherein the terahertz wave detection device includes:
a wavelength filter transmitting terahertz waves having a predetermined wavelength; and
a detection portion detecting the terahertz waves having the predetermined wavelength that have passed through the wavelength filter by converting the terahertz waves into heat,
wherein the wavelength filter includes:
a metal layer having a plurality of holes communicating with an incident surface onto which the terahertz waves that are emitted from the terahertz wave generation device are incident and an emission surface from which the terahertz waves having the predetermined wavelength are emitted; and
a dielectric portion filling in the plurality of holes and made of a dielectric, and
wherein the plurality of holes are formed with a predetermined pitch along a direction that is perpendicular to a normal line of the incident surface.

18. A measurement device comprising:
a terahertz wave generation device generating terahertz waves;
a terahertz wave detection device detecting the terahertz waves that are emitted from the terahertz wave generation device and penetrate or are reflected from an object; and
a measurement unit measuring the object based on the result of the detection performed by the terahertz wave detection device,
wherein the terahertz wave detection device includes:
a wavelength filter transmitting terahertz waves having a predetermined wavelength; and
a detection portion detecting the terahertz waves having the predetermined wavelength that have passed through the wavelength filter by converting the terahertz waves into heat,
wherein the wavelength filter includes:
a metal layer having a plurality of holes communicating with an incident surface onto which the terahertz waves that are emitted from the terahertz wave generation device are incident and an emission surface from which the terahertz waves having the predetermined wavelength are emitted; and
a dielectric portion filling in the plurality of holes and made of a dielectric, and
wherein the plurality of holes are formed with a predetermined pitch along a direction that is perpendicular to a normal line of the incident surface.

* * * * *